United States Patent
Sasaki

(10) Patent No.: US 7,009,171 B2
(45) Date of Patent: Mar. 7, 2006

(54) LASER SCANNING MICROSCOPE SYSTEM AND SCANNING UNIT APPLIED TO THE SYSTEM

(75) Inventor: Hiroshi Sasaki, Tokyo (JP)

(73) Assignee: Olympus Optical Co., Ltd., Tokyo (JP)

( * ) Notice: Subject to any disclaimer, the term of this patent is extended or adjusted under 35 U.S.C. 154(b) by 335 days.

(21) Appl. No.: 10/650,061

(22) Filed: Aug. 27, 2003

(65) Prior Publication Data

US 2004/0178334 A1 Sep. 16, 2004

(30) Foreign Application Priority Data

Aug. 28, 2002 (JP) ............................. 2002-248855

(51) Int. Cl.
*H01J 3/14* (2006.01)
*H01J 40/14* (2006.01)
*H01J 5/16* (2006.01)

(52) U.S. Cl. ........................................ 250/234; 359/656
(58) Field of Classification Search ................ 250/234, 250/239, 458.1; 359/656
See application file for complete search history.

(56) References Cited

U.S. PATENT DOCUMENTS 6,094,300 A * 7/2000 Kashima et al. ............ 359/385
6,381,074 B1 * 4/2002 Yoshida ....................... 359/661

FOREIGN PATENT DOCUMENTS

| JP | 06-167654 A | 6/1994 |
|---|---|---|
| JP | 2959830 B2 | 7/1999 |
| JP | 11-231222 A | 8/1999 |

* cited by examiner

*Primary Examiner*—David Porta
*Assistant Examiner*—Seung C. Sohn
(74) *Attorney, Agent, or Firm*—Frishauf, Holtz, Goodman & Chick, P.C.

(57) ABSTRACT

The laser scanning microscope system includes a microscope unit including at least one laser source, at least a microscope main body, a stage on which a sample is laid, an objective lens which converges a light from a sample to form a parallel light, and a first image formation lens which converges the parallel light from the objective lens, and at least one light detector which detects light from the sample through a confocal pinhole, and a scanning unit disposed attachably/detachably with respect to the microscope main body, the scanning unit includes a optical scanning device which scans a laser light from the laser source, a pupil projection lens and a second image formation lens arranged so that the optical scanning device and a pupil position of the objective lens are optically conjugated, and at least one photodetector which detects light from the optical scanning device through a confocal pinhole, and the scanning unit is attached to the microscope main body so that an optical axis of an optical path branched by a deflection part disposed between the objective lens and the first image formation lens is aligned with that of the optical path of the second image formation lens.

14 Claims, 4 Drawing Sheets

LASER SCANNING MICROSCOPE SYSTEM AND SCANNING UNIT APPLIED TO THE SYSTEM

CROSS-REFERENCE TO RELATED APPLICATIONS

This application is based upon and claims the benefit of priority from the prior Japanese Patent Application No. 2002-248855, filed Aug. 28, 2002, the entire contents of which are incorporated herein by reference.

BACKGROUND OF THE INVENTION

1. Field of the Invention

The present invention relates to a laser scanning microscope system in which a laser light is scanned with respect to a sample to irradiate the sample and the light from the sample is detected, and a scanning unit applied to the laser scanning microscope system.

2. Description of the Related Art

In a laser scanning microscope, a point source of laser light is scanned in X, Y-axis directions with respect to a sample via an objective lens to irradiate the sample. Fluorescence or reflected light from the sample is detected by a photodetector via the objective lens and an optical system again. Accordingly, two-dimensional information of the sample is obtained, and the result is displayed in monitor screens such as CRT so that the result can be observed as image information.

In this laser scanning microscope, a light scanning mirror is deflected to scan a light spot on the sample in the X, Y-axis directions. In this case, as an optimum arrangement of an optical scanning system, for example, there is a laser scanning microscope disclosed in Jpn. Pat. No. 2959830 the entire contents of which are incorporated herein by reference.

Additionally, for the laser scanning microscope for general use at present, for example, as disclosed in Jpn. Pat. Appln. KOKAI Publication No. 11-231222 the entire contents of which are incorporated herein by reference, in a combination of a microscope with upright frame and scanning unit, the light scanning mirror and a pupil projection lens are incorporated on the scanning unit, and an image formation lens (described as a first tube lens) is incorporated on the microscope. As disclosed in Jpn. Pat. Appln. KOKAI Publication No. 06-167654 the entire contents of which are incorporated herein by reference, even in a combination of an inverted microscope and scanning unit, the light scanning mirror and pupil projection lens are incorporated on the scanning unit, and the image formation lens (described as the tube lens) is incorporated in an epi-illumination light path on the microscope.

BRIEF SUMMARY OF THE INVENTION

The laser scanning microscope system according to the first aspect of the present invention is characterized by comprising: at least one laser source; a microscope unit comprising at least a microscope main body, a stage on which a sample is laid, an objective lens which converges a light from a sample to form a parallel light, and a first image formation lens which converges the parallel light from the objective lens; a scanning unit disposed attachably/detachably with respect to the microscope main body, the scanning unit comprising: a optical scanning device which scans a laser light from the laser source; a pupil projection lens and a second image formation lens arranged so that the optical scanning device and a pupil position of the objective lens are optically conjugated; and at least one photodetector which detects light from the optical scanning device through a confocal pinhole, wherein the scanning unit is attached to the microscope main body so that an optical axis of an optical path branched by a deflection part disposed between the objective lens and the first image formation lens is aligned with that of the optical path of the second image formation lens.

The laser scanning microscope system according to the second aspect of the present invention is characterized by comprising: an objective lens which converges a laser light from a laser source to form a light spot on a sample; an optical scanning device which scans the light spot in a two-dimensional plane on the sample; and a pupil projection lens and an image formation lens arranged in a predetermined positional relation in an optical path of the laser light of the laser source so that the optical scanning device and a pupil position of the objective lens are brought into an optically conjugated arrangement, wherein the pupil projection lens, the image formation lens, and the optical scanning device are disposed in one scanning unit, and the optical scanning device, the pupil projection lens, and the image formation lens are linearly arranged along the optical path of the laser light of the laser source.

The scanning unit, applied to a laser scanning microscope system comprising: an objective lens which converges laser light from a laser source to form a light spot on a sample; an optical scanning device which scans the light spot in a two-dimensional plane on the sample; and a pupil projection lens and an image formation lens arranged in a predetermined positional relation in an optical path of the laser light of the laser source so that the optical scanning device and a pupil position of the objective lens are brought into an optically conjugated arrangement, according to the fourth aspect of the present invention is characterized by comprising: the pupil projection lens; the image formation lens; and the optical scanning device.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described hereinafter with reference to the drawings.

(First Embodiment)

Figure 1:
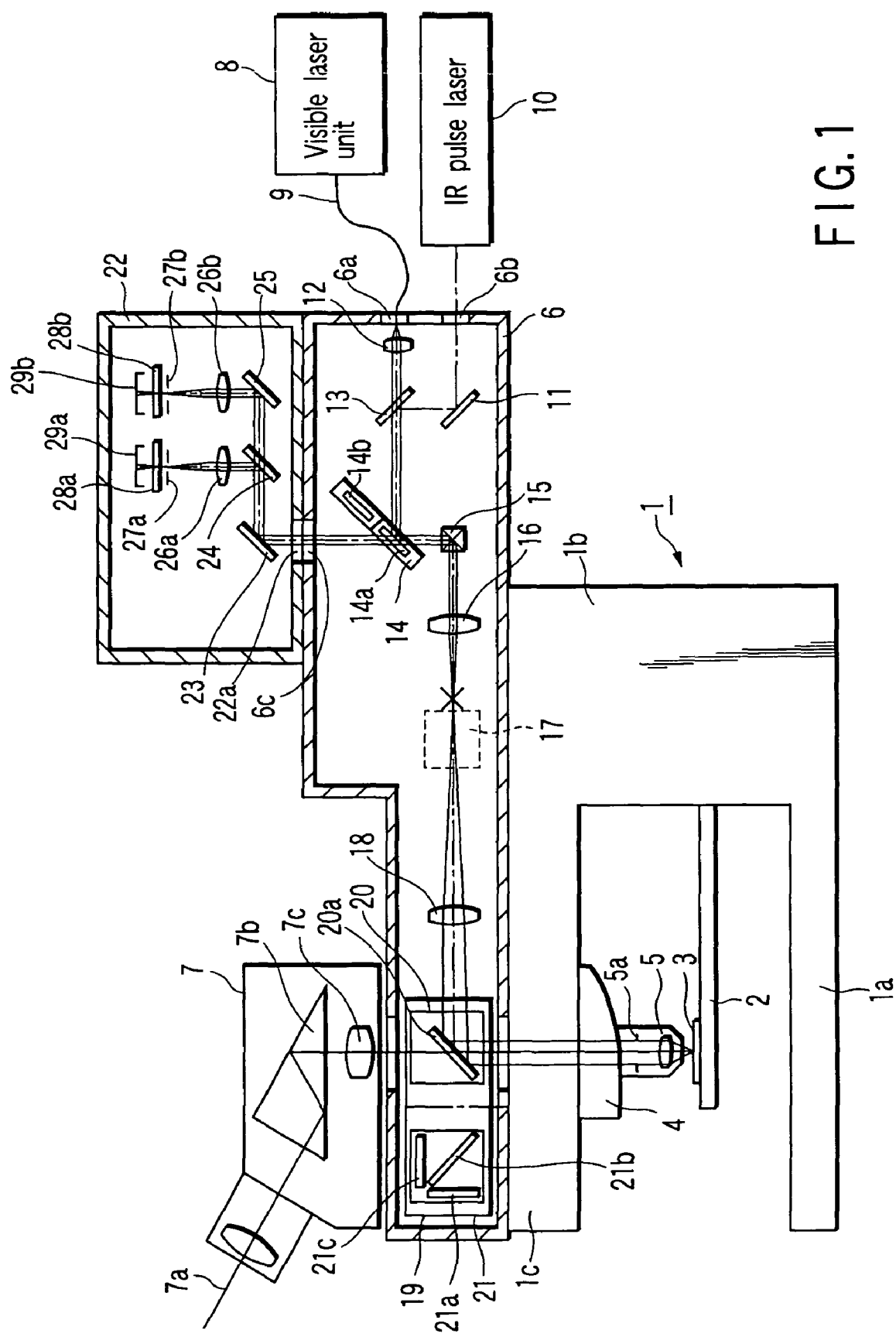
FIG. 1 is a diagram showing a schematic configuration of a laser scanning microscope system combined with a microscope with upright frame according to a first embodiment of the present invention.

FIG. 1 shows a schematic configuration of a laser scanning microscope system combined with a microscope with upright frame to which the present invention is applied. In FIG. 1, a microscope main body 1 includes a base section 1a in a horizontal direction, and a body section 1b formed so as to rise perpendicularly with respect to the base section 1a. An arm portion 1c is disposed in parallel with the base section 1a in an upper end of the body section 1b.

In the body section 1b of the microscope main body 1, a stage 2 is disposed so as to be movable in an optical axis direction of an objective lens 5 (details will be described later). A sample 3 is laid on the stage 2.

A revolver 4 is disposed in the arm portion 1c. The revolver 4 includes a plurality of objective lenses 5 (only one is shown in a shown example) disposed opposite to the sample 3 on the stage 2, and the objective lenses 5 are selectively switched on an optical path by a rotation operation of the revolver 4. It is to be noted that reference numeral 5a indicates a pupil position of the objective lens 5.

A scanning block 6 which is a frame of the whole scanning unit is fixed on the arm portion 1c via screws (not shown). An observation tube unit 7 is disposed on the scanning block 6. The scanning block 6 includes a support part (corresponding to a frame, hatching portion of FIG. 1), and a light scanning mirror 15, pupil projection lens 16, and image formation lens 18 described later are fixed to the support part.

In the observation tube unit 7, a prism 7b, and an image formation lens 7c for the microscope, which is a first image formation lens are disposed on an eyepiece observation light path 7a.

It is to be noted that in the present embodiment the objective lens 5 is preferably an infinity correction objective lens, and a luminous flux between the objective lens 5 and image formation lens for the microscope 7c extends in parallel.

In the scanning block 6, a visible laser guide hole 6a and IR pulse laser guide hole 6b are disposed. A single mode fiber 9 is inserted through the visible laser guide hole 6a, and visible laser light from a visible laser unit 8 is guided into the scanning block 6. For the IR pulse laser guide hole 6b, an IR pulse laser 10 for use in two-photon excitation system is disposed, and IR pulse laser from the IR pulse laser 10 is guided into the scanning block 6.

A mirror 11 is disposed on the optical path of the IR pulse laser in the scanning block 6. A beam combining dichroic mirror 13 is disposed on the optical path of the visible laser light derived from the single mode fiber 9 via a collimating lens 12.

The mirror 11 reflects the IR pulse laser in a predetermined direction. The beam combining dichroic mirror 13 synthesizes optical paths of the visible laser light converted into a parallel light having a predetermined diameter by the collimating lens 12 and the IR pulse laser reflected by the mirror 11.

A turret for an excitation dichroic mirror 14 is disposed on the synthesized optical path of the beam combining dichroic mirror 13. The turret for the excitation dichroic mirror 14 includes a plurality of (two in the shown example) excitation dichroic mirrors 14a, 14b which reflect an excitation light and which transmit fluorescence. The excitation dichroic mirrors 14a, 14b are selectively switched on the synthesized optical path of the beam combining dichroic mirror 13 by a motor (not shown). In the example shown in FIG. 1, state in which the excitation dichroic mirror 14a is positioned on the optical path is shown.

The light scanning mirror 15 is disposed as an optical scanning device on a reflected light path of the excitation dichroic mirror 14a. In the present embodiment, details of the light scanning mirror 15 are omitted, and the mirror includes two mirrors for deflecting the light in a vertical direction on a drawing sheet surface and in a vertical direction of FIG. 1, respectively. These two mirrors are disposed in the vicinity of each other in a range in which no collision occurs at a deflecting time. When these mirrors are deflected, the scanning of the light in X, Y directions is performed.

On a light scanning path of the light scanning mirror 15, the pupil projection lens 16, an optical path switch section 17 which is an optical path switching device, the image formation lens 18 which is a second image formation lens, and a cube turret 19 which is deflection means are linearly disposed. The cube turret 19 includes a mirror unit 20 including a light deflection mirror 20a, and a fluorescent cube unit 21 including an excitation filter 21a, dichroic mirror 21b, and emission filter 21c. The cube turret 19 is rotated/driven by the motor (not shown). At the time of observation by the laser scanning microscope, the mirror unit 20 is disposed on an optical axis of the objective lens 5. At the time of eyepiece observation using epi-illumination by a mercury lamp, the fluorescent cube unit 21 is disposed on the optical axis of the objective lens 5. In the example shown in FIG. 1, the mirror unit 20 is disposed on the optical axis of the objective lens 5.

On the other hand, a detection block 22 which is a detection unit is disposed to be attachable/detachable with respect to the scanning block 6. In this case, the blocks are integrally fixed via a plurality of screws (not shown) in a state in which an opening 22a of the detection block 22 is aligned with an opening 6c on the scanning block 6.

In the detection block 22, a reflective mirror 23 is disposed on a transmitted light path of the excitation dichroic mirror 14a guided from the opening 6c on the scanning block 6 via the opening 22a. On the reflected light path of the reflective mirror 23, a spectral dichroic mirror 24 for splitting the optical path for each wavelength range, and a reflective mirror 25 are disposed. In reflected light paths of the spectral dichroic mirror 24 and reflective mirror 25, photodetectors 29a, 29b are disposed via confocal lenses 26a, 26b, confocal confocal pinholes 27a, 27b, and barrier filters 28a, 28b for regulating a taken fluorescent range by cutting off an excitation laser wavelength.

Figure 2:
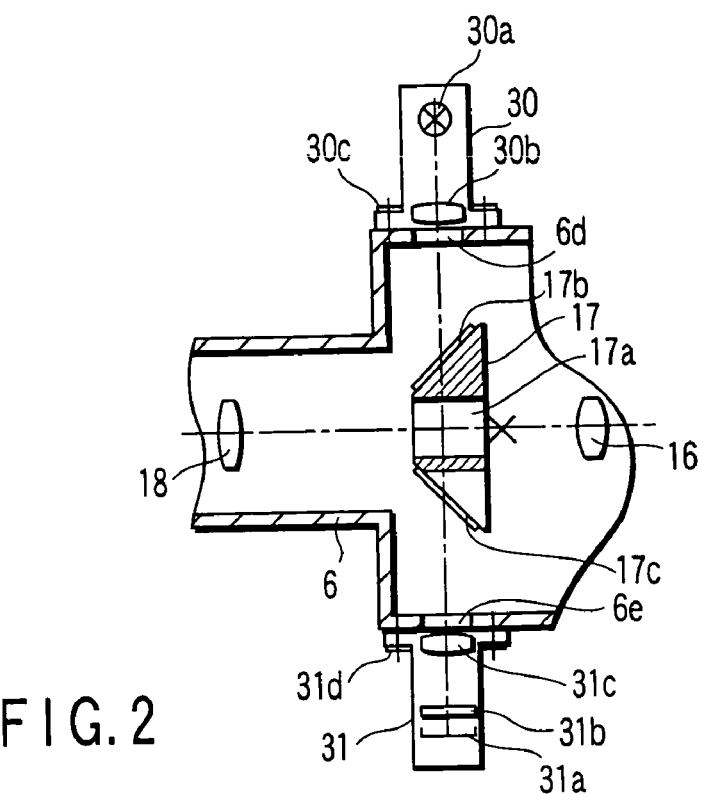
FIG. 2 is a diagram showing the schematic configuration of a light path switch section of a scanning block of the first embodiment seen from above.

FIG. 2 is a diagram of the optical path switch section 17 of the scanning block 6 seen from above.

In this case, the optical path switch section 17 includes a hole 17a, mirror 17b, and dichroic mirror 17c, and any of the hole 17a, mirror 17b, and dichroic mirror 17c can selectively be disposed on the optical path by an electromotive optical path switch mechanism (not shown).

FIG. 2 shows an example of confocal observation using the visible laser unit 8. The hole 17a of the optical path switch section 17 is disposed on the optical path. In this case, the mirror unit 20 of the cube turret 19 is disposed on the optical axis of the objective lens 5, and the visible laser light (excitation light) from the visible laser unit 8 is used to detect the fluorescence from the sample 3 by the photodetectors 29a, 29b via the confocal confocal pinholes 27a, 27b in the detection block 22.

An opening 6d is formed as an additional port in one side surface of the scanning block 6, and a mercury lamp illumination unit 30 is disposed attachably/detachably via the opening 6d by screws 30c. The mercury lamp illumination unit 30 includes a mercury lamp 30a and lens 30b, and is used as an epi-illumination light source for carrying out visual observation via the eyepiece observation light path 7a of the observation tube unit 7 described above.

In the visual observation using the mercury lamp illumination unit 30 described above, the mirror 17b is disposed on the optical path by the optical path switch section 17. The fluorescent cube unit 21 of the cube turret 19 is disposed on the optical axis of the objective lens 5. Moreover, when an illumination light is emitted from the mercury lamp 30a of the mercury lamp illumination unit 30, the light is reflected by the mirror 17b. An excitation light including desired wavelength components is extracted by the excitation filter 21a, and reflected on the objective lens 5 by the dichroic mirror 21b to illuminate the whole sample 3. The fluorescence from the sample 3 passes through the dichroic mirror 21b. A fluorescent wavelength region to be observed is extracted by the emission filter 21c, and observed by the eyepiece observation light path 7a via the image formation lens for the microscope 7c and prism 7b.

On the other hand, an opening 6e is formed as another additional port in the other side face of the scanning block 6, and an external detector unit 31 which is an additional unit is disposed attachably/detachably via the opening 6e by screws 31d. The external detector unit 31 includes a photodetector 31a, IR cut filter 31b, and lens 31c. For example, as described in Jpn. Pat. Appln. KOKAI Publication No. 2000-330029, the unit is used for detecting the fluorescence produced by a two-photon excitation phenomenon without returning the fluorescence to the light scanning mirror or the confocal confocal pinholes. Here, the IR cut filter 31b includes characteristics to cut off a near-infrared wavelength oscillated from the IR pulse laser 10 with which the sample 3 is to be irradiated and to transmit the wavelength of the fluorescence generated from the sample 3.

When the fluorescence generated by the two-photon excitation phenomenon caused by the IR pulse laser 10 is detected, the dichroic mirror 17c is disposed on the optical path by the optical path switch section 17. The mirror unit 20 of the cube turret 19 is disposed on the optical axis of the objective lens 5. Here, the dichroic mirror 17c includes characteristics for transmitting the near-infrared wavelength (e.g., 800 nm) oscillated from the IR pulse laser 10 which causes the two-photon excitation phenomenon to irradiate the sample 3 with the wavelength and for reflecting a fluorescent wavelength emitted from the sample 3 by the two-photon excitation on the external detector unit 31.

Moreover, when the IR pulse laser is emitted from the IR pulse laser 10, the light passes through the dichroic mirror 17c of the optical path switch section 17, and is reflected on the objective lens 5 by the mirror unit 20 to illuminate the sample 3. The fluorescence emitted from the sample 3 by the two-photon excitation is reflected on the external detector unit 31 by the dichroic mirror 17c, and is detected by the photodetector 31a via the lens 31c and IR cut filter 31b.

Next, an operation of the embodiment constituted in this manner will be described.

First, the confocal observation using the visible laser unit 8 will be described.

In this case, the hole 17a of the optical path switch section 17 is disposed on the optical path. The mirror unit 20 of the cube turret 19 is disposed on the optical axis of the objective lens 5.

In this state, when the visible laser light (assumed as an argon laser light having a wavelength of 488 nm here) is emitted from the visible laser unit 8, the light passes as the excitation light through the single mode fiber 9, and is guided into the visible laser guide hole 6a of the scanning block 6.

Moreover, the light is converted to a parallel light having a predetermined diameter by the collimating lens 12 disposed in the tip end of the single mode fiber 9, further transmitted through the beam combining dichroic mirror 13, and reflected downwards by the excitation dichroic mirror 14a of the turret for the excitation dichroic mirror 14. Here, the excitation dichroic mirror 14a includes characteristics for reflecting the laser wavelength of 488 nm and for transmitting a fluorescent wavelength (500 to 600 nm) emitted by irradiation of the sample 3 with the excitation light of 488 nm.

The excitation light reflected by the excitation dichroic mirror 14a is deflected in the vertical direction of FIG. 2 and in a direction crossing at right angles to the drawing sheet surface by the light scanning mirror 15. Moreover, the light is transmitted through the pupil projection lens 16, the hole 17a of the optical path switch section 17, and the image formation lens 18, and is reflected downwards by the mirror 20a of the mirror unit 20. Furthermore, a light spot is formed on the sample 3 by the objective lens 5.

The fluorescence (500 to 600 nm) emitted from the sample 3 proceeds in an opposite direction in the optical path of the excitation light described above, and reaches the excitation dichroic mirror 14a via the mirror 20a, image formation lens 18, hole 17a, pupil projection lens 16, and light scanning mirror 15.

Moreover, the light passes through the excitation dichroic mirror 14a, reaches the indetection block 22 via the opening 6c of the scanning block 6 and the opening 22a of the detection block 22, and is reflected by the reflective mirror 23.

Thereafter, the light is split into predetermined wavelength regions by the spectral dichroic mirror 24. One fluorescence is transmitted through the confocal lens 26a, confocal confocal pinhole 27a, and barrier filter 28a and detected by the photodetector 29a, and the other fluorescence is reflected by the reflective mirror 25, transmitted through the confocal lens 26b, confocal confocal pinhole 27b, and barrier filter 28b, and detected by the photodetector 29b.

It is to be noted that the spectral dichroic mirror 24 is assumed to include characteristics for reflecting the wavelength of 550 nm or less and transmitting the wavelength of 570 nm or more. Accordingly, the fluorescence having a wavelength of 550 nm or less is detected by the photodetector 29a, and the fluorescence having a wavelength of 570 nm or more is detected by the photodetector 29b.

Additionally, a positional relation between the pupil projection lens 16 and image formation lens 18 (in a optical axis direction and in a plane crossing at right angles to the optical axis) needs to be adjusted to position the light scanning mirror 15 so that the light is exactly projected in the pupil position 5a of the objective lens 5 via the mirror 20a by the pupil projection lens 16 and image formation lens 18, that is, the light scanning mirror 15 and the pupil position 5a of the objective lens 5 have an optically conjugated arrangement.

The light scanning mirror 15, pupil projection lens 16, and image formation lens 18 are all disposed in the scanning block 6. Therefore, when the positional relation is exactly adjusted within the scanning block 6 at its assembly time, it is possible to avoid influences of a combination error by the image formation lens included in a microscope unit for use, and the system can easily be set up by a user.

Moreover, for the optical paths of the light scanning mirror 15, pupil projection lens 16, and image formation lens 18, there is not any return such as the mirror. Since the optical paths are linearly arranged, it is possible to further reduce an error at the time of the adjustment of the positional relation.

Furthermore, since the mirror 20a of the mirror unit 20 for turning the optical path back toward the objective lens 5 is also disposed in the scanning block 6, an angular error in the mirror 20a can be adjusted together with the scanning block 6 at its time of assembly.

Next, an operation for detecting the fluorescence generated in the two-photon excitation phenomenon caused by the IR pulse laser 10 by the external detector unit 31 will be described.

In this case, the dichroic mirror 17c of the optical path switch section 17 is disposed on the optical path. The mirror unit 20 of the cube turret 19 is disposed on the optical axis of the objective lens 5.

In this state, when the IR pulse laser (assumed to have a wavelength of 800 nm here) is emitted from the IR pulse laser 10, the light is guided as the excitation light into the IR pulse laser guide hole 6b of the scanning block 6.

Subsequently, the light is reflected upwards by the mirror 11, reflected by the beam combining dichroic mirror 13, and reflected downwards by the excitation dichroic mirror 14b of the turret for the excitation dichroic mirror 14. Here, the excitation dichroic mirror 14b includes characteristics for reflecting a laser wavelength of 800 nm and for transmitting the fluorescent wavelength range, which is excited by 800 nm as two-photon excitation.

The excitation light reflected by the excitation dichroic mirror 14b is deflected in the vertical direction of the sheet surface and in the direction crossing at right angles to the sheet surface by the light scanning mirror 15. Moreover, the light is transmitted through the pupil projection lens 16, dichroic mirror 17c, and image formation lens 18, and reflected downwards by the mirror 20a of the mirror unit 20. Furthermore, the light spot is formed on the sample 3 by the objective lens 5.

The fluorescence generated from the sample 3 by the two-photon excitation phenomenon proceeds in the opposite direction in the optical path of the excitation light described above, and passes through the mirror unit 20 and image formation lens 18. Moreover, the light is reflected downwards in FIG. 2, that is, toward the external detector unit 31 by the dichroic mirror 17c, transmitted through the lens 31c and IR cut filter 31b, and detected by the photodetector 31a.

Figure 3:
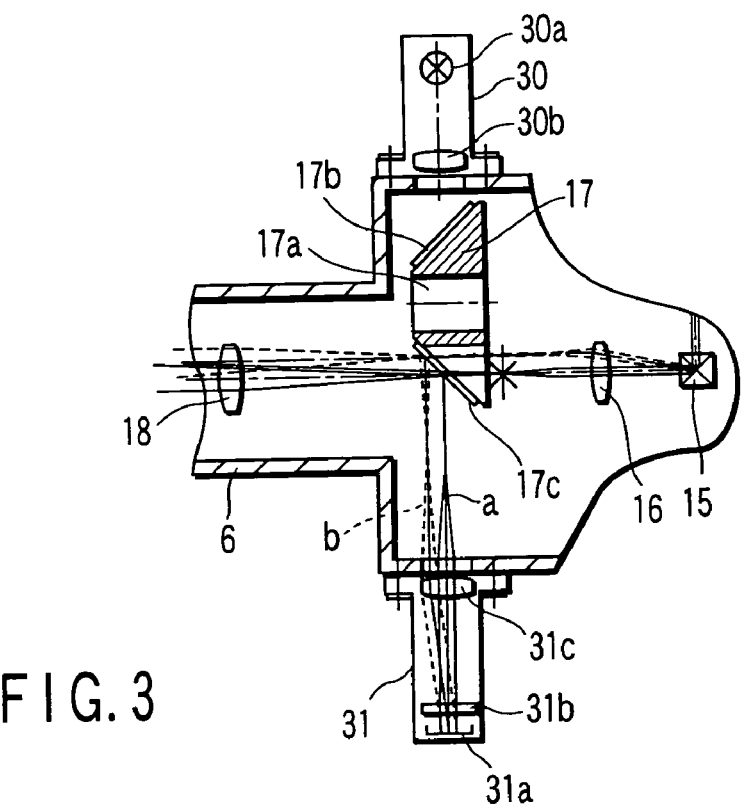
FIG. 3 is an explanatory view of an operation of the first embodiment.

In this case, the lens 31c allows the fluorescence reflected from the dichroic mirror 17c to enter the center of the photodetector 31a, even when a deflecting angle of the excitation light by the light scanning mirror 15 is inclined, that is, when the light is deflected (scanned) in the end of a view field on the sample 3. FIG. 3 is an explanatory view of details of this state, solid lines a in FIG. 3 show a ray diagram at the time of the deflecting (scanning) of the center of the view field on the sample 3, and dot lines b in FIG. 3 show a ray diagram at the time of the deflecting (scanning) of the end of the view field on the sample 3. In this case, the photodetector 31a and the pupil position 5a of the objective lens 5 are brought into the optical conjugated relation by the lens 31c and image formation lens 18. In this case, even when the end of the view field is deflected (scanned) by the light scanning mirror 15, the fluorescence is securely brought into the center in the position of the photodetector 31a.

In this manner, the external detector unit 31 for observing the two-photon excitation is attached to the scanning block 6 which is separated by the optical path switch section 17 and which is a frame of the whole scanning unit. Therefore, the unit of the microscope is not influenced, or use convenience is not adversely affected. Conversely, the external detector unit 31 itself is not influenced by the unit of the microscope.

In the system of the two-photon excitation in which the IR pulse laser 10 is used, the laser itself is expensive at several tens of millions of yen, and is scarcely used. However, an optical path switch mechanism into the external detector unit 31 in which the system is mounted is shared with the optical path switch mechanism into the mercury lamp illumination unit 30 for use in most of usual confocal laser scanning microscopes. Regardless of presence/absence of the external detector unit 31, a driving system of the optical path switch mechanism can be used in common. Especially, when the optical path switch mechanism is of an electromotive type, an electric control system can also be used in common. Even when the external detector unit 31 is added later, the driving mechanism and electric control system of the optical path switch section are mounted on the scanning block 6 from the beginning, and there is an advantage that the section does not have to be modified.

Therefore, in the above-described case, since the light scanning mirror 15, pupil projection lens 16, and image formation lens 18 constituting the optical scanning system are all disposed in the scanning block 6. Therefore, when the positional relation among these is exactly adjusted in the assembly time, the system cannot be influenced by a combination error by the image formation lens 7c in the observation tube 7. Accordingly, in the combination even with any microscope, the optical adjustment of the optical scanning system can easily and securely be carried out. Since the mercury lamp illumination unit 30 and external detector unit 31 are attached on the scanning block 6, each unit of the microscope main body 1 is not adversely affected. Furthermore, attachment or use convenience of these units can be prevented from being limited.

Moreover, according to the above-described first embodiment, the following effects can also be anticipated.

Since the image formation lens 18 for use in the optical scanning system can exclusively be used in the confocal observation, it is not necessary to consider limiting conditions such as the field number at the time of eyepiece observation of the observation tube unit 7, and an optimum optical design can easily be carried out with respect to the optical scanning system.

A focal distance matched with a magnification display of the objective lens 5 does not have to be adapted for the image formation lens 18. Therefore, a degree of freedom in design increases, and the whole apparatus can also be miniaturized. In this case, the magnification may be adjusted by the combination of the pupil projection lens 16 and image formation lens 18 to design the system.

Since the scanning unit is attached to an infinite optical path, various standard observation tubes such as a observation tube and tilting observation tube to which two TV cameras can be attached can be used without being limited.

MODIFICATION EXAMPLE 1

In the above-described first embodiment, the scanning block 6 and detection block 22 are constituted in divided frames. A merit of the configuration divided in this manner lies in that the scanning block 6 is connected to the detection block 22 only by the openings 6c, 22a at minimum, and therefore a possibility of mixture of stray light or scattered light generated by the deflection of the light scanning mirror 15 into the photodetectors 29a, 29b in the detection block 22 can be reduced. The fluorescence has a brightness of 1/1000 or less of that of the excitation light. Therefore, when these stray and scattered lights are inputted into the detectors, SN of a detected image is deteriorated. However, unless the influences of the stray and scattered lights raise any problem, the scanning block 6 and detection block 22 may be contained in one frame to entirely constitute one scanning unit in order to reduce the number of components or the number of unnecessary steps such as screw fastening.

MODIFICATION EXAMPLE 2

In the first embodiment, the scanning block 6 is constituted as one frame of the whole unit, in which the light scanning mirror 15, pupil projection lens 16, and image formation lens 18 are included, but separate frames may also be constituted. For example, the image formation lens 18 is contained in a second frame prepared by lathe processing, and this frame is fixed to a first frame including the light scanning mirror 15, pupil projection lens 16, and optical path switch section 17 via the screws. Moreover, even when the light scanning mirror 15, pupil projection lens 16, and image formation lens 18 are adjusted and positioned at the time of the fixing, the effect similar to that at the time of the manufacturing in one frame. In any case, there is not any limitation as long as the light scanning mirror 15, pupil projection lens 16, and image formation lens 18 are adjusted as a single scanning unit.

(Second Embodiment)

Next, a second embodiment will be described.

Figure 4:
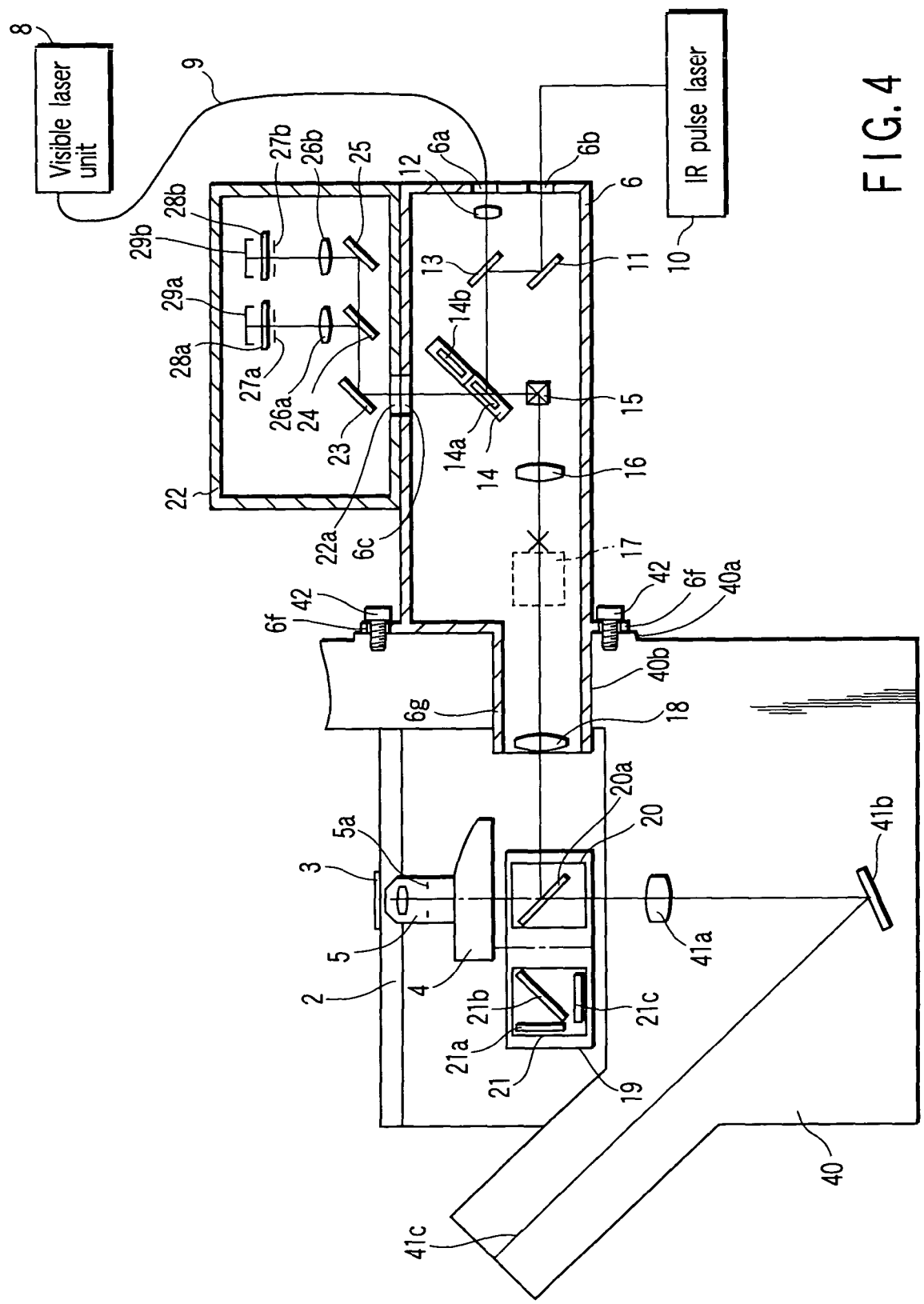
FIG. 4 is a diagram showing the schematic configuration of the laser scanning microscope system combined with an inverted microscope according to a second embodiment of the present invention.

FIG. 4 shows the schematic configuration of the laser scanning microscope system combined with an inverted microscope to which the present invention is applied. The same components as those of FIG. 1 are denoted with the same reference numerals.

In FIG. 4, in an inverted microscope unit 40, the revolver 4 is disposed under the stage 2 on which the sample 3 is laid. In the revolver 4, a plurality of objective lenses 5 (only one is shown in the example shown in FIG. 4) are disposed opposite to the sample 3 on the stage 2. The scanning block 6 is attached to the microscope unit 40 instead of a fluorescent reflected light illuminator (epi-fluorescent illuminator) for guiding an epi-illumination light into the microscope unit 40. The cube turret 19 is disposed on a scanning light path of the scanning block 6. The cube turret 19 includes the mirror unit 20 including the mirror 20a, and the fluorescent cube unit 21 including the excitation filter 21a, dichroic mirror 21b, and emission filter 21c. At the time of the eyepiece observation time using the epi-illumination by the mercury lamp, the fluorescent cube unit 21 is disposed on the optical axis of the objective lens 5. In this case, the epi-illumination light is reflected by the dichroic mirror 21b on the objective lens 5 to irradiate the sample 3. The fluorescence from the sample 3 passes through the dichroic mirror 21b, the fluorescent wavelength region to be observed is extracted via the emission filter 21c, and the region is observed by an eyepiece observation optical path 41c via an image formation lens 41a and reflective mirror 41b.

In this case, the present embodiment is different from the first embodiment in that the cube turret 19 is not included in the scanning block 6 and the components up to the image formation lens 18 are built in the scanning block 6.

Moreover, flange sections 6f are disposed in the scanning block 6, and fixed onto an attachment face 40a by a screw 42 on the inverted microscope unit 40. The positioning of the scanning block 6 and inverted microscope unit 40 at the time of the fixing is realized by the fitting of a protrusion 6g disposed on the scanning block 6 into a hole 40b disposed on the inverted microscope unit 40. Here, in the scanning block 6, the positional relation among the light scanning mirror 15, pupil projection lens 16, and image formation lens 18 is exactly adjusted in a unit level on the basis of an abutment face of the flange sections 6f of the scanning block 6 onto the attachment face 40a of the inverted microscope unit 40 and a fitting diameter of the protrusion 6g of the scanning block 6 into the hole 40b of the inverted microscope unit 40.

Therefore, even in this case, it is possible to set up the system without being influenced by a combination error by the image formation lens 41a included in the microscope unit 40. Also in this case, since the optical paths of the light scanning mirror 15, pupil projection lens 16, and image formation lens 18 are linearly arranged without any return such as the mirror, it is possible to further reduce the error at the time of the adjustment.

Furthermore, when the mercury lamp illumination unit and external detector unit (not shown) are mounted in the scanning block 6 in the same manner as in the first embodiment, each unit of the microscope main body 1 is not adversely affected. Moreover, the attachment and use conveniences of these units can be prevented from being limited.

That is, even in the combination with the inverted microscope in this manner, the system is not influenced by the error of the microscope unit to be combined. Therefore, in the combination even with any microscope, the optical adjustment of the optical scanning system can easily and securely be carried out. The mercury lamp illumination unit and external detector unit can be attached without adversely affecting the units on the microscope.

(Third Embodiment)

Next, a third embodiment will be described.

Figure 5:
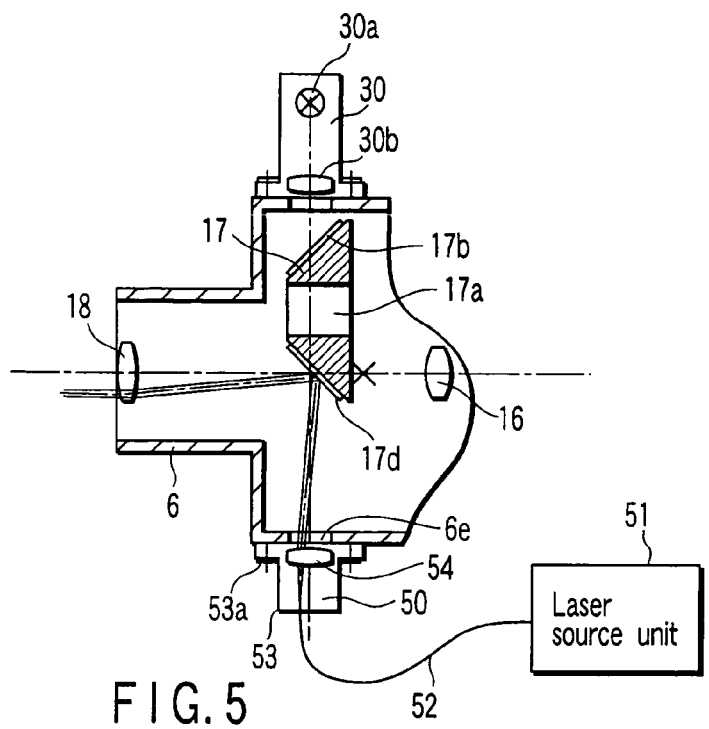
FIG. 5 is a diagram showing the schematic configuration of a major part of the laser scanning microscope system according to a third embodiment of the present invention.

FIG. 5 is a diagram showing the schematic configuration of a major part of the laser scanning microscope system to which the present invention is applied. The same components as those of FIG. 1 are denoted with the same reference numerals.

In the third embodiment, instead of the external detector unit 31, a laser illumination apparatus 50 for the fluorescent observation is attachably/detachably disposed as another additional unit that carries out illumination (evanescent illumination) using total reflection of the excitation light in the opening 6e which is the additional port of the scanning block 6. For the optical path switch section 17, a reflective mirror 17d is attached in place of the dichroic mirror 17c.

Figure 6:
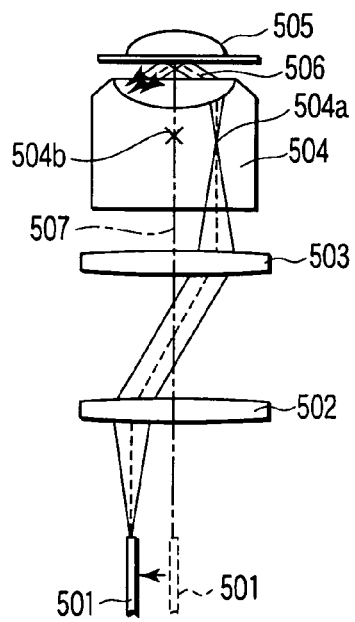
FIG. 6 is an explanatory view of evanescent illumination for use in the third embodiment.

The illumination apparatus using the evanescent illumination is description, for example, in Jpn. Pat. Appln. KOKAI Publication No. 2001-272606. FIG. 6 is an explanatory view of a principle of the evanescent illumination. A laser light derived from a laser source (not shown) is emitted from a fiber 501, and focused on a point 504a deviating from a center 504b in a pupil plane (rear focal position) of an objective lens 504 via lenses 502, 503. Subsequently, a sample 505 is obliquely irradiated with light beams 506 passed through the objective lens 504 and converted to the parallel light, and the evanescent illumination is obtained. In this case, an end face of the fiber 501 is moved in a plane vertical to an optical axis 507 of the objective lens 504, and usual Koehler illumination is also obtained.

Turning back to FIG. 5, the laser illumination apparatus 50 includes a laser guide unit 53 in which an excitation laser light is guided from a laser source unit 51 via a single mode fiber 52. The laser guide unit 53 is fixed in the opening 6e of the scanning block 6 by screws 53a. A lens 54 corresponding to the lens 502 is disposed in the laser guide unit 53.

Subsequently, when the excitation laser light is guided into the laser guide unit 53 via the single mode fiber 52, the excitation laser light is reflected by the reflective mirror 17d of the optical path switch section 17 via the lens 54, and focused in a position (corresponding to a point 504a of FIG. 6) deviating from the optical axis center in the pupil plane (rear focal position) of the objective lens 5 shown in FIG. 1 by the image formation lens 18 corresponding to the lens 503. Subsequently, the sample 3 is obliquely irradiated with the laser light transmitted through the objective lens 5 which is the parallel light, and the evanescent illumination is obtained. Here, in the same manner as in FIG. 6, when the end face of the single mode fiber 52 is moved in a plane vertical to the optical axis, the illumination can also be switched to the usual Koehler illumination.

According to the third embodiment, the laser illumination apparatus which carries out the evanescent illumination is attached to the scanning block 6 which is the frame of the whole scanning unit. Accordingly, each unit of the microscope main body 1 is not adversely affected at the time of the attaching of the laser illumination apparatus 50, and the attachment and use conveniences of these units can be prevented from being limited.

(Fourth Embodiment)

Next, a fourth embodiment will be described.

Figure 7:
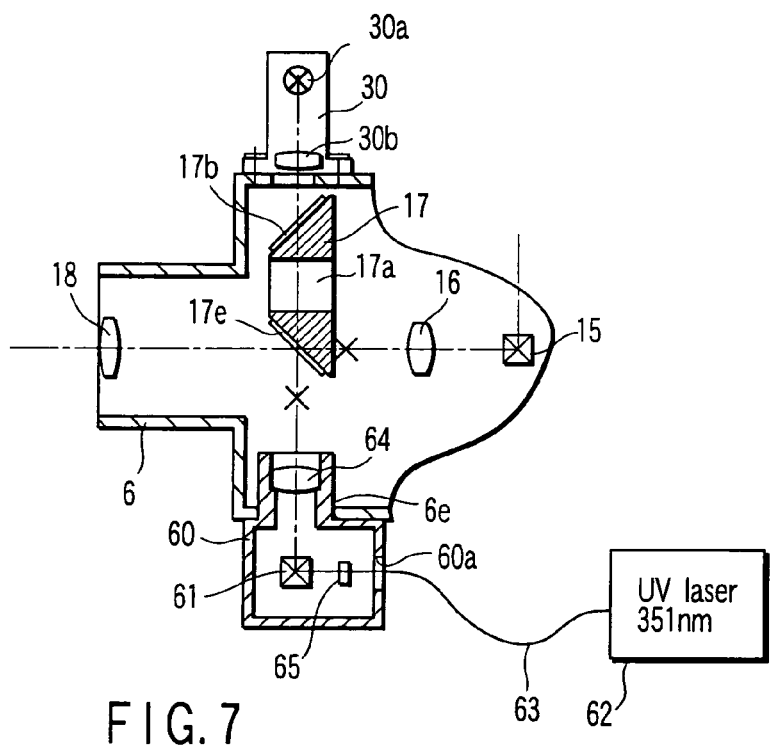
FIG. 7 is a diagram showing the schematic configuration of the major part of the laser scanning microscope system according to a fourth embodiment of the present invention.

FIG. 7 shows the schematic configuration of the major part of the laser scanning microscope system to which the present invention is applied. The same components as those of FIG. 1 are denoted with the same reference numerals.

In FIG. 7, instead of the laser illumination apparatus 50, a second scanning unit 60 is attachably/detachably disposed as another additional unit in the opening 6e which is the additional port of the scanning block 6. For the optical path switch section 17, in place of the dichroic mirror 17d, a dichroic mirror 17e is attached which combines the optical path from a first scanning unit including the light scanning mirror 15 for acquiring the image with that from the second scanning unit 60.

In the second scanning unit 60, a light scanning mirror 61 is disposed to deflect the light in the direction crossing at right angles to the sheet surface and in a left/right direction of FIG. 7. The light scanning mirror 61 scans the light on the sample 3 plane independently of the light scanning in the light scanning mirror 15 for acquiring the image, disposed in the scanning block 6. That is, in the fourth embodiment, when a specific portion of the sample 3 is irradiated with a UV light in the second scanning unit 60, a substance enclosed in a caged group in the sample 3 is released (caged release), and the image is also acquired in the first scanning unit.

A laser guide section 60a is disposed in the second scanning unit 60. A UV laser 62 which oscillates an ultraviolet ray of 351 nm for the caged release is guided into the laser guide section 60a via a fiber 63.

An acousto-optical device 65, the light scanning mirror 61, and a pupil projection lens 64 are disposed on the optical path of the UV laser 62 in the second scanning unit 60. In this case, the acousto-optical device 65 switches the ON/OFF of UV laser irradiation. The pupil projection lens 64 as well as the image formation lens 18 in the scanning block 6 bring the position of the light scanning mirror 61 into an optically conjugated relation with the pupil position 5a of the objective lens 5.

The light scanning mirror 61, light scanning mirror 15, and acousto-optical device 65 are controlled by a controller (not shown), and a UV laser irradiation position with respect to the scanning in the light scanning mirror 15, irradiation timing, and the like are controlled.

In this configuration, the laser light of 351 nm oscillated from the UV laser 62 is deflected by the light scanning mirror 61, transmitted through the pupil projection lens 64, and guided into the dichroic mirror 17e of the optical path switch section 17. Here, the dichroic mirror 17e has characteristics for reflecting an ultraviolet wavelength of 351 nm and transmitting the visible laser wavelength from the light scanning mirror 15 and the visible fluorescent wavelength to be detected.

Accordingly, the laser light transmitted through the pupil projection lens 64 is reflected by the dichroic mirror 17e to pass through the image formation lens 18. An arbitrary position on the sample 3 is irradiated via the objective lens 5 shown in FIG. 5 to carry out the caged release. These operations can be carried out independently of the first scanning unit including the light scanning mirror 15 for acquiring the image.

Therefore, since the second scanning unit 60 is attached to the scanning block 6 in the fourth embodiment, each unit of the microscope main body 1 is not adversely affected at the time of the attaching of the second scanning unit 60, and the attachment and use conveniences of these units can be prevented from being limited.

Moreover, since the image formation lens 18 in the scanning block 6 is shared also in the second scanning unit 60, the configuration can accordingly be simplified, and price can also be reduced.

It is to be noted that a method for using the second scanning unit 60 is not limited to the caged release. For example, a certain portion on the sample 3 is irradiated with an intense excitation light by the laser light from the second scanning unit 60. During photo-bleaching, the image is acquired in the first scanning unit. The photodetector may also be attached on the second scanning unit 60, so that the image can also be acquired in two scanning units.

Additionally, the present invention is not limited to the embodiment, and can variously be modified in a range in which the scope is not changed in an implementation stage.

To be "attachable/detachable" in the embodiment means either an operation level at which a user of the microscope can attach/detach the units or an operation level at which a microscope producerattaches/detaches the units while carrying out the system setting or necessary adjustment, such as setup (or installation) of the laser scanning microscope system.

Moreover, the external detector unit 31, laser illumination apparatus 50, and second scanning unit 60 have been described as the additional units in the embodiment, but the mercury lamp illumination unit 30 can also be considered as one additional unit. Moreover, these four types of units can arbitrarily be combined with the optical paths branched by the optical path switch section 17 and connected. For example, instead of the mercury lamp illumination unit 30 of FIG. 2, the laser illumination apparatus 50 or the second scanning unit 60 may also be connected. An optical path branch direction in the optical path switch section 17 is also branched in an upper direction in FIG. 1, and three units including the external detector unit 31, laser illumination apparatus 50, and second scanning unit 60 may also be connected. Needless to say, any one of these three may be replaced with the mercury lamp illumination unit 30. The microscope main body 1 may be constituted so that a lower optical path branch direction of the optical path switch section 17 in FIG. 1 is also possible. Then, all the four units can also be connected.

Furthermore, the above-described embodiments include various stages of the invention, and various inventions can be extracted by appropriate combinations in a plurality of disclosed constituting elements. For example, even when some constituting elements are removed from all the constituting elements described in the embodiments, the problem described in paragraphs of the problem to be solved by the invention can be solved, and the effect described in the paragraphs of the effect of the present invention is obtained. In this case, a configuration from which the constituting elements are removed can be extracted as the invention.

As a result, according to the present invention, since the light scanning mirror, pupil projection lens, and image formation lens 18 constituting the optical scanning system are all arranged in one scanning unit. Therefore, when the positional relation among these is exactly adjusted in the assembly time, the unit can be prevented from being influenced by the combination error of the units such as the image formation lens included in the microscope unit for use. Accordingly, even in the combination even with any microscope, the optical scanning system can easily and securely be subjected to the optical adjustment.

Moreover, according to the present invention, since the mercury lamp illumination unit or the additional unit is disposed on the scanning unit, each unit of the microscope is not adversely affected, and the attachment or use convenience of these units can be prevented from being limited.

As described above, according to the present invention, there can be provided a laser scanning microscope system which is not influenced by errors of units of a microscope even in the combination with any microscope and in which optical adjustment of an optical scanning system can easily and securely be carried out.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A laser scanning microscope system comprising:
   at least one laser source;
   a microscope unit comprising at least a microscope main body, a stage on which a sample is laid, an objective lens which converges a light from a sample to form a parallel light, and a first image formation lens which converges the parallel light from the objective lens;
   a scanning unit disposed attachably/detachably with respect to the microscope main body, the scanning unit comprising: a optical scanning device which scans a laser light from the laser source; a pupil projection lens and a second image formation lens arranged so that the optical scanning device and a pupil position of the objective lens are optically conjugated; and
   at least one photodetector which detects light from the optical scanning device through a confocal pinhole, wherein
   the scanning unit is attached to the microscope main body so that an optical axis of an optical path branched by a deflection part disposed between the objective lens and the first image formation lens is aligned with that of the optical path of the second image formation lens.

2. The laser scanning microscope system according to claim 1, wherein the optical scanning device, the pupil projection lens, and the second image formation lens are linearly arranged along the optical path of the laser light of the laser source.

3. The laser scanning microscope system according to claim 1, wherein a mercury lamp illumination unit is attachably/detachably provided to the scanning unit, and the scanning unit comprises an optical path switching device for selectively switching an illumination light path of the mercury lamp and a laser light path of the laser source.

4. The laser scanning microscope system according to claim 3, wherein an additional unit is attachably/detachably provided to the scanning unit, and the optical path switching device can selectively switch the optical paths including an optical path with respect to the additional unit.

5. The laser scanning microscope system according to claim 1, wherein an additional unit is attachably/detachably provided to the scanning unit.

6. The laser scanning microscope system according to claim 5, wherein the additional unit is an external detector unit which detects light from the sample without descanning.

7. The laser scanning microscope system according to claim 5, wherein the additional unit is a laser illumination device for evanescent illumination.

8. The laser scanning microscope system according to claim 5, wherein the additional unit is a second scanning unit.

9. The laser scanning microscope system according to claim 1, wherein the photodetector as well as a confocal pinhole through which the light from the sample passes constitute a detection unit, and the detection unit is disposed attachably/detachably with respect to the scanning unit.

10. The laser scanning microscope system according to claim 1, wherein the microscope unit further comprises an observation tube, the microscope main body is upright, the first image formation lens is disposed in the observation tube, and the scanning unit is disposed between the microscope main body and the observation tube.

11. The laser scanning microscope system according to claim 10, wherein the deflection part is disposed in the scanning unit.

12. The laser scanning microscope system according to claim 1, wherein the microscope main body is inverted, and the scanning unit is attached to the microscope main body instead of a reflected light illuminator which guides an epi-illumination light into the microscope main body.

13. A laser scanning microscope system comprising:
  an objective lens which converges a laser light from a laser source to form a light spot on a sample;
  an optical scanning device which scans the light spot in a two-dimensional plane on the sample;
  a pupil protection lens and an image formation lens arranged in a predetermined positional relation in an optical path of the laser light of the laser source so that the optical scanning device and a pupil position of the objective lens are brought into an optically conjugated arrangement, wherein
  the pupil projection lens, the image formation lens, and the optical scanning device are disposed in one scanning unit, and
  the optical scanning device, the pupil projection lens, and the image formation lens are linearly arranged along the optical path of the laser light of the laser source.

14. A scanning unit applied to a laser scanning microscope system comprising: an objective lens which converges laser light from a laser source to form a light spot on a sample; an optical scanning device which scans the light spot in a two-dimensional plane on the sample; and a pupil projection lens and an image formation lens arranged in a predetermined positional relation in an optical path of the laser light of the laser source so that the optical scanning device and a pupil position of the objective lens are brought into an optically conjugated arrangement, the scanning unit comprising:
  the pupil projection lens;
  the image formation lens; and
  the optical scanning device.

* * * * *